United States Patent
Biskeborn et al.

(10) Patent No.: US 9,484,056 B2
(45) Date of Patent: Nov. 1, 2016

(54) DYNAMIC ADJUSTMENTS OF TAPE HEAD WRAP ANGLES

(71) Applicant: International Business Machines Corporation, Armonk, NY (US)

(72) Inventors: Robert G. Biskeborn, Hollister, CA (US); Jason Liang, Campbell, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/922,240

(22) Filed: Oct. 26, 2015

(65) Prior Publication Data

US 2016/0171998 A1    Jun. 16, 2016

Related U.S. Application Data

(63) Continuation of application No. 14/567,154, filed on Dec. 11, 2014, now Pat. No. 9,230,590.

(51) Int. Cl.
| | |
|---|---|
| *G11B 15/093* | (2006.01) |
| *G11B 15/43* | (2006.01) |
| *G11B 5/48* | (2006.01) |
| *G11B 15/60* | (2006.01) |
| *G11B 5/008* | (2006.01) |

(52) U.S. Cl.
CPC ......... *G11B 15/093* (2013.01); *G11B 5/00813* (2013.01); *G11B 5/48* (2013.01); *G11B 15/43* (2013.01); *G11B 15/60* (2013.01)

(58) Field of Classification Search
CPC . G11B 5/00813; G11B 5/153; G11B 15/005; G11B 15/093; G11B 15/43

USPC ........ 360/74.3, 83, 251, 251.2, 241, 130.21, 360/130.31
See application file for complete search history.

(56) References Cited

U.S. PATENT DOCUMENTS

| | | | |
|---|---|---|---|
| 4,333,618 A * | 6/1982 | Seaman ........... | G11B 23/08778 242/346 |
| 4,956,737 A | 9/1990 | Brock | |
| 5,481,417 A | 1/1996 | Yokoyama et al. | |
| 5,923,494 A * | 7/1999 | Arisaka ................ | G11B 5/5504 360/75 |
| 6,222,698 B1 * | 4/2001 | Barndt ............... | G11B 5/00813 360/76 |
| 6,633,449 B1 | 10/2003 | Anderson et al. | |
| 6,690,531 B2 | 2/2004 | Richards et al. | |
| 6,700,733 B1 * | 3/2004 | Biskeborn .............. | G11B 15/60 360/130.21 |
| 6,809,897 B2 * | 10/2004 | Magnusson ............ | G11B 15/67 360/85 |

(Continued)

FOREIGN PATENT DOCUMENTS

JP    09180313 A    7/1997

OTHER PUBLICATIONS

IBM, List of IBM Patents or Patent Applications Treated as Related, Appendix P, 2 pages, dated Oct. 26, 2015.

(Continued)

*Primary Examiner* — Thomas Alunkal
(74) *Attorney, Agent, or Firm* — Noah A. Sharkan

(57) ABSTRACT

Embodiments of the present invention provide tape drives and methods for operating a tape drive. In one embodiment, tape head wrap angles are dynamically adjusted to increase or decrease contact pressure of magnetic tape on modules of a tape head. Embodiments of the present invention can be used to extend the lifespan of tape drives and components, and enable usage of tape media having increased smoothness and areal density.

18 Claims, 15 Drawing Sheets

(56) References Cited

U.S. PATENT DOCUMENTS

| | | | |
|---|---|---|---|
| 6,856,488 B2 | 2/2005 | King et al. | |
| 6,918,553 B2* | 7/2005 | Zwettler | G11B 15/43 242/334.6 |
| 7,206,873 B1* | 4/2007 | Hennecken | G06F 3/0613 360/18 |
| 7,342,738 B1* | 3/2008 | Anderson | G11B 5/584 360/77.12 |
| 7,486,464 B2 | 2/2009 | Saliba | |
| 7,874,507 B2* | 1/2011 | Biskeborn | G11B 15/43 242/346.2 |
| 8,243,396 B2 | 8/2012 | Biskeborn et al. | |
| 8,432,640 B2 | 4/2013 | Fasen et al. | |
| 8,493,682 B2* | 7/2013 | Bui | G11B 5/00826 360/71 |
| 8,665,560 B1 | 3/2014 | Biskeborn et al. | |
| 2002/0044382 A1* | 4/2002 | Brong | G11B 5/41 360/128 |
| 2003/0039045 A1* | 2/2003 | Biskeborn | G11B 15/62 360/27 |
| 2003/0039077 A1* | 2/2003 | Biskeborn | G11B 5/56 360/291 |
| 2005/0190611 A1* | 9/2005 | Rushton | G11B 11/10595 365/189.09 |
| 2006/0056108 A1* | 3/2006 | Saliba | G11B 5/00817 360/129 |
| 2011/0013313 A1* | 1/2011 | Bui | G11B 5/0083 360/77.12 |
| 2014/0198403 A1 | 7/2014 | Biskeborn et al. | |

OTHER PUBLICATIONS

Xia et al., "Active Tape Steering Control System", Proceedings of the 17th World Congress, The International Federation of Automatic Control, Jul. 6-11, 2008, Seoul, Korea, pp. 3118-3123, © 2008 IFAC.

Biskeborn et al., "Dynamic Adjustments of Tape Head Wrap Angles", U.S. Appl. No. 14/567,154, filed Dec. 11, 2014, pp. 1-46.

\* cited by examiner

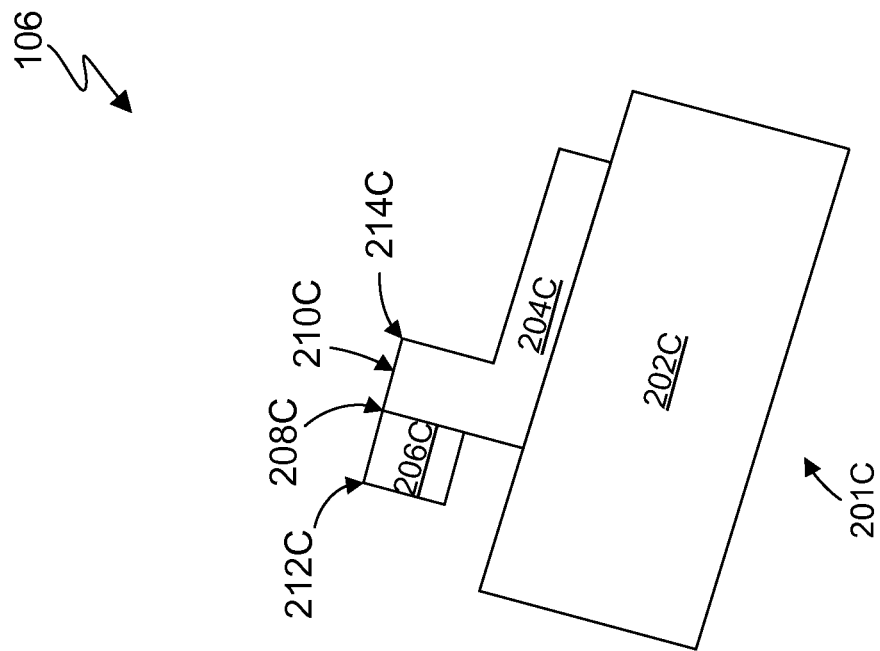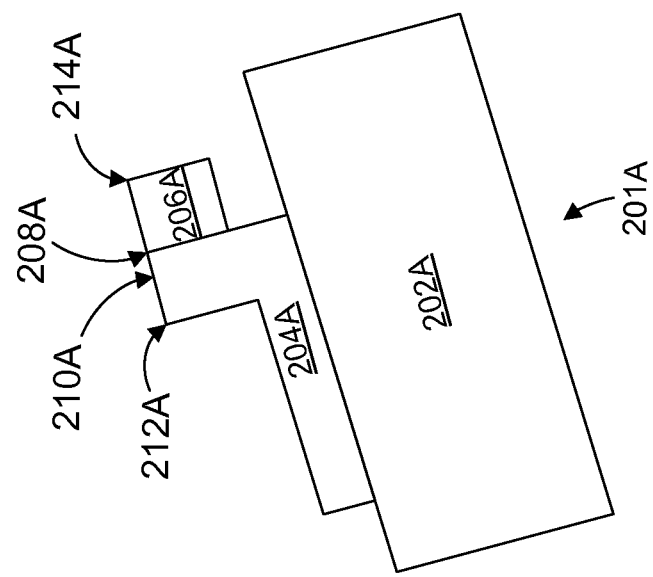
FIG. 3

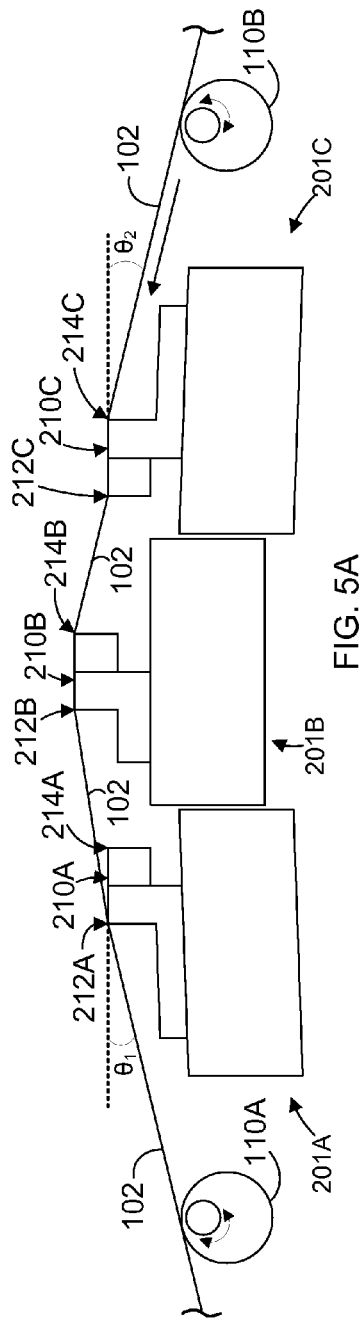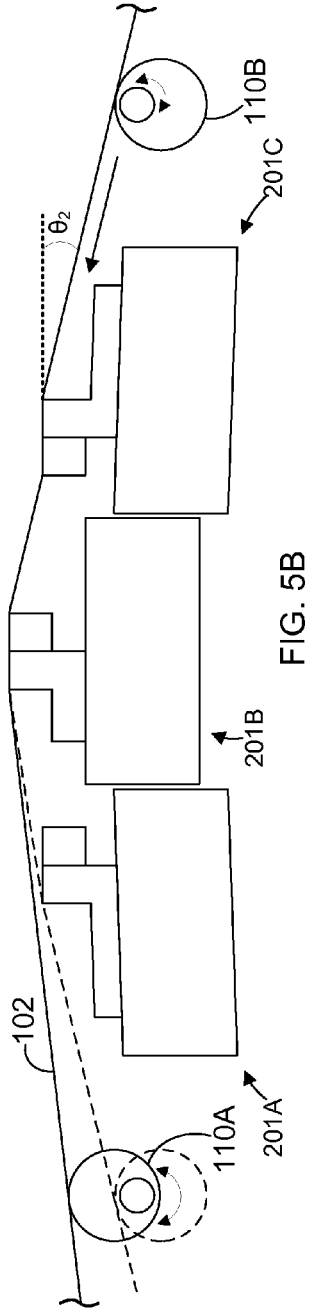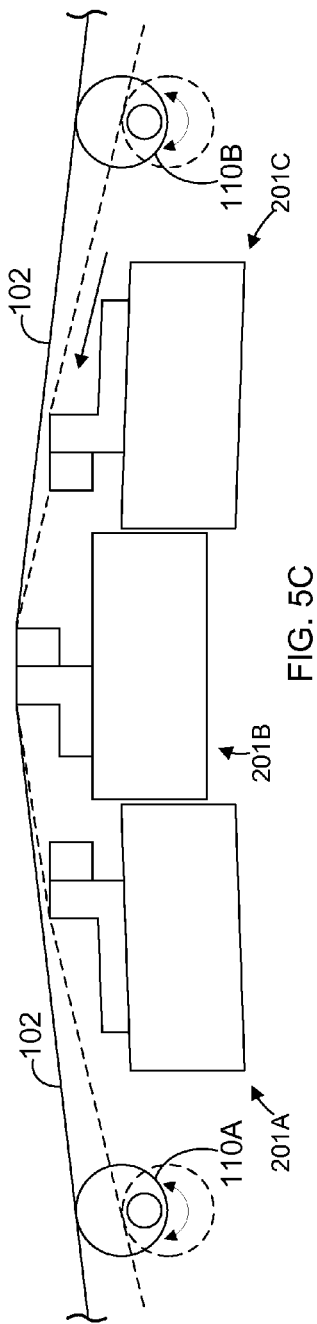

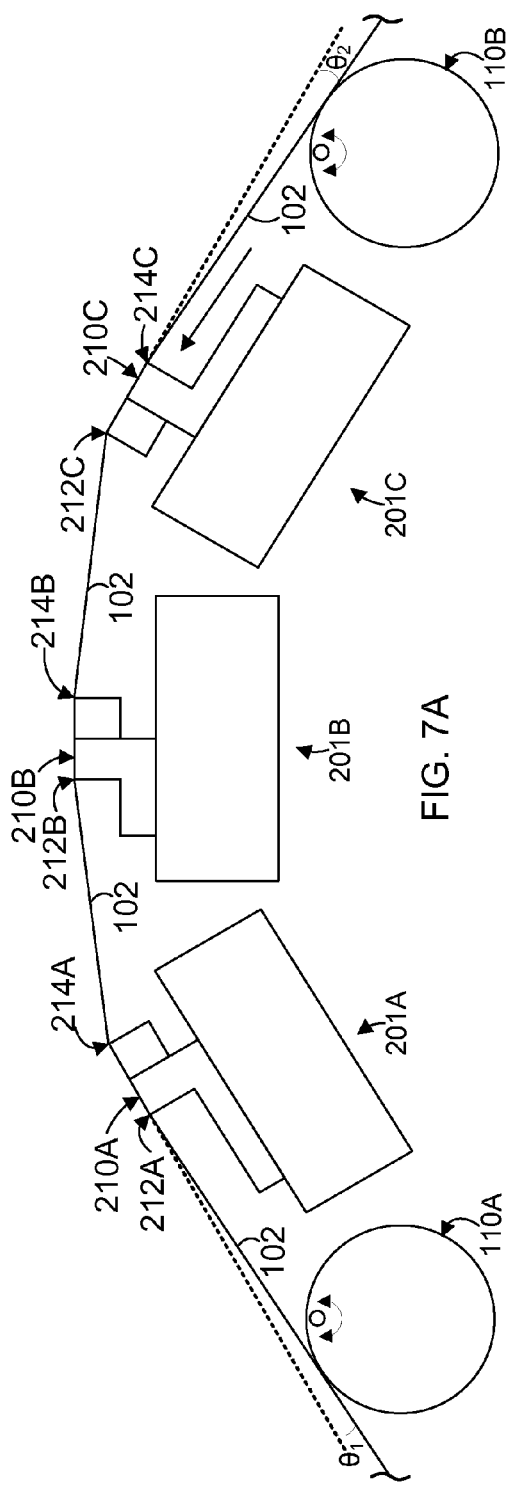
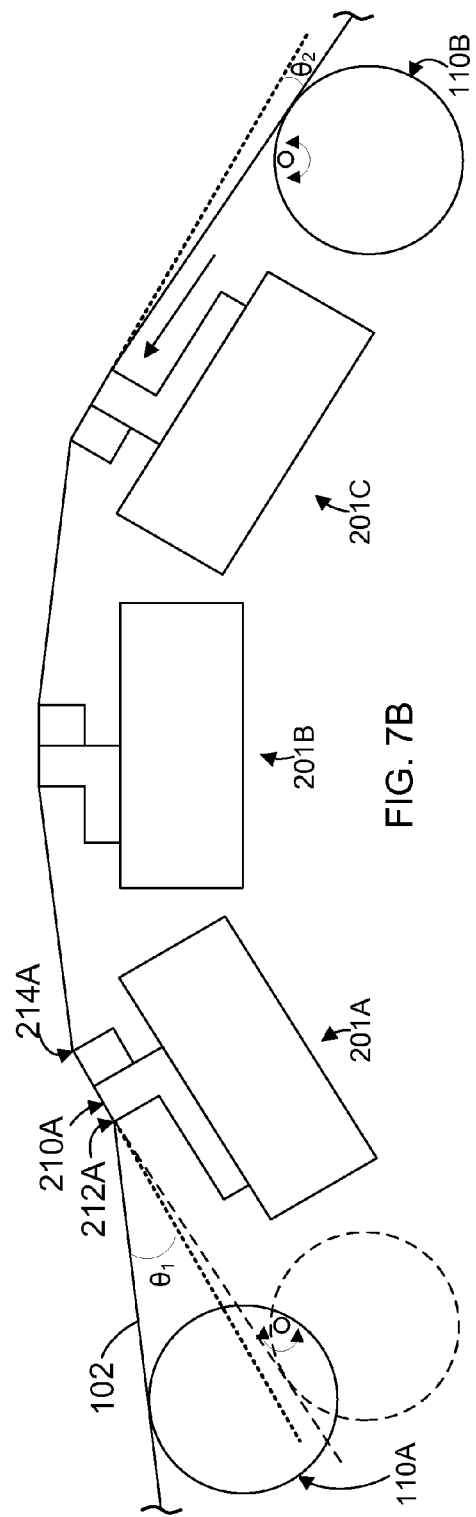
FIG. 7A
FIG. 7B

DYNAMIC ADJUSTMENTS OF TAPE HEAD WRAP ANGLES

BACKGROUND OF THE INVENTION

The present invention relates generally to the field of magnetic tape storage, and more particularly to adjustment of tape head wrap angles.

In a magnetic tape storage system, magnetic tape is moved over the surface of one or more reader and writer modules of a tape head. These actions can result in head wear and stiction, both of which can reduce the lifespan of magnetic tape storage systems, potentially even resulting in catastrophic failure. Furthermore, as magnetic tape technology continues to improve, smoother tape media and increased areal densities will likely necessitate even lower tolerances for head wear and stiction.

SUMMARY

Embodiments of the present invention provide tape drives and methods for operating a tape drive. In one embodiment, one or more computer processors identify one or more modules of a tape head that are not needed during a first tape drive operation. Responsive to one or more computer processors detecting commencement of the first tape drive operation, one or more tape supports are moved to disengage magnetic tape from the identified one or more modules of the tape head that are not needed during the first tape drive operation.

In another embodiment, a tape drive is provided, comprising a tape head, a plurality of tape supports, and a controller. The controller is configured to perform operations comprising identifying one or more modules of the tape head for which a tape head wrap angle should be modified for a duration of a tape drive operation; and responsive to detecting commencement of the tape drive operation, moving one or more tape supports to modify a tape head wrap angle of magnetic tape over the identified one or more modules of the tape head for the duration of the tape drive operation.

BRIEF DESCRIPTION OF THE DRAWINGS

FIG. 3 is a diagram illustrating a tape head, in accordance with another embodiment of the present invention;

FIGS. 5A-5C are diagrams illustrating movement of rollers to achieve various wrap angles and disengage tape from the tape head of FIG. 2, in accordance with an embodiment of the present invention;

FIGS. 7A-7C are diagrams illustrating movement of rollers to achieve various wrap angles and disengage tape from the tape head of FIG. 4, in accordance with an embodiment of the present invention;

DETAILED DESCRIPTION

Embodiments of the present invention provide tape drives and methods for operating a tape drive to reduce stiction, tape wear, and/or tape head wear by dynamically controlling tape head wrap angles in response to various conditions and/or events, and by disengaging one or more read and write modules of a tape head when not needed for read and write operations. By dynamically adjusting tape contact pressure and, in some cases, completely disengaging tape from one or more modules of a tape head, embodiments of the present invention can extend the lifespan of tape drives and components, and enable usage of tape media having increased smoothness and areal density.

Figure 1:
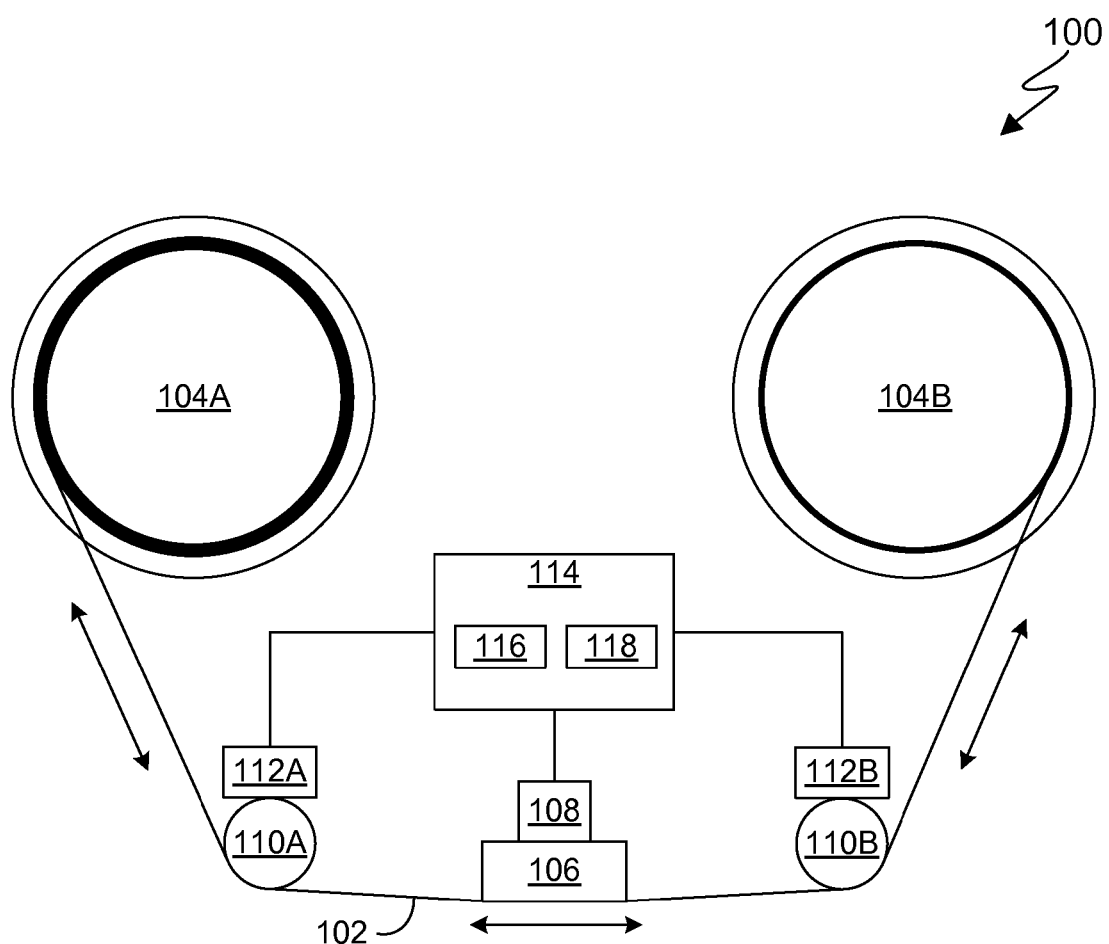
FIG. 1 is a diagram illustrating a tape storage system, in accordance with an embodiment of the present invention.

FIG. 1 is a diagram illustrating a tape drive 100, in accordance with an embodiment of the present invention. Tape drive 100 includes tape 102, tape reels 104A and 104B, tape head 106, actuator 108, rollers 110A and 110B, actuators 112A and 112B, and controller 114.

Tape 102 comprises magnetic tape on which data can be written and from which data can be read by tape head 106. Tape 102 can be implemented with any suitable magnetic tape known in the art.

Tape 102 is wrapped around, and supported by, tape reels 104A and 104B. One or more drive motors (not shown) controlled by controller 114 are used to rotate tape reels 104A and 104B to control linear movement of tape 102 across tape head 106 (as shown by double-headed arrows). When tape 102 travels across tape head 106 from tape reel 104A toward tape reel 104B, tape reel 104A serves as the tape supply reel and tape reel 104B serves as the take-up reel; when tape 102 travels across tape head 106 from tape reel 104B toward tape reel 104A, tape reel 104B serves as the supply reel while tape reel 104A serves as the take-up reel. Tape reels 104A and 104B, along with tape 102, may be implemented as parts of a removable tape cartridge that is inserted into a tape drive containing the other depicted components of tape drive 100.

Tape head 106 writes data to, and reads data from, tape 102. Tape head 106 can be implemented with any suitable type of tape head known in the art. In this embodiment, tape head 106 comprises an array of modules for reading and writing data on tape 102. Tape head 106 also comprises one or more servo readers for reading servo tracks on tape 102 to ensure that reader and writer modules of tape head 106 are aligned with the appropriate tracks during read and write operations. For example, as discussed in greater detail with regard to FIGS. 2, 4, 5A-5C and 7A-7C, tape head 106 can comprise an array of three modules in a writer-reader-writer configuration. As discussed in greater detail with regard to FIGS. 3 and 4A-4C, tape head 106 can comprise an array of two modules in a reader/writer-reader/writer configuration. In yet other embodiments, tape head 106 can comprise an array of a greater number of modules in any desired configuration.

Actuator 108 controls movement of tape head 106 relative to tape 102 to position one or more modules of tape head 106 over appropriate tracks on tape 102 during read and write operations.

Rollers 110A and 110B guide tape 102 between tape head 106 and tape reels 104A and 104B, respectively. Actuators 112A and 112B control movement of rollers 110A and 110B, respectively, relative to tape head 106. As discussed in greater detail later in this specification, rollers 110A and 110B can be adjusted to increase or decrease contact pressure between tape 102 and tape head 106 based on a variety of factors, which can help reduce stiction and wear of tape head 106 and tape 102. In other embodiments of the present invention, a greater or lesser number of rollers may be used, including fixed rollers and/or additional moveable rollers. Similarly, other suitable tape support structures and guides may be used instead of, or in addition to, rollers.

Controller 114 is operatively coupled (e.g., by one or more electrical connections) to tape head 106 and actuators 108, 112A, and 112B. Controller 114 controls actuators 112A and 112B to move rollers 110A and 110B and tape 102 relative to tape head 106 to dynamically adjust wrap angles of tape 102 and/or to disengage tape 102 from tape head 106. Controller 114 also controls actuator 108 and tape head 106 to perform functions such as servo following, writing of data to tape 102, and reading of data from tape 102. Controller 114 may comprise a processor and/or any logic for controlling tape drive 100. In this embodiment, controller 114 includes a memory 116 (e.g., non-volatile memory) on which program instructions may be stored for execution by controller 114 to perform various operations disclosed herein. Controller 114 also includes an interface 118 for communicating data between tape drive 100 and a host (integral or external), such as data to be written to or read from tape 102 by tape head 106, data for controlling tape drive 100, and data communicating the status of tape drive 100 to the host. In general, controller 114 may be configured and/or programmable to perform or control some or all of the operations discussed herein using hardware, software, firmware, and/or combinations thereof.

Figure 2:
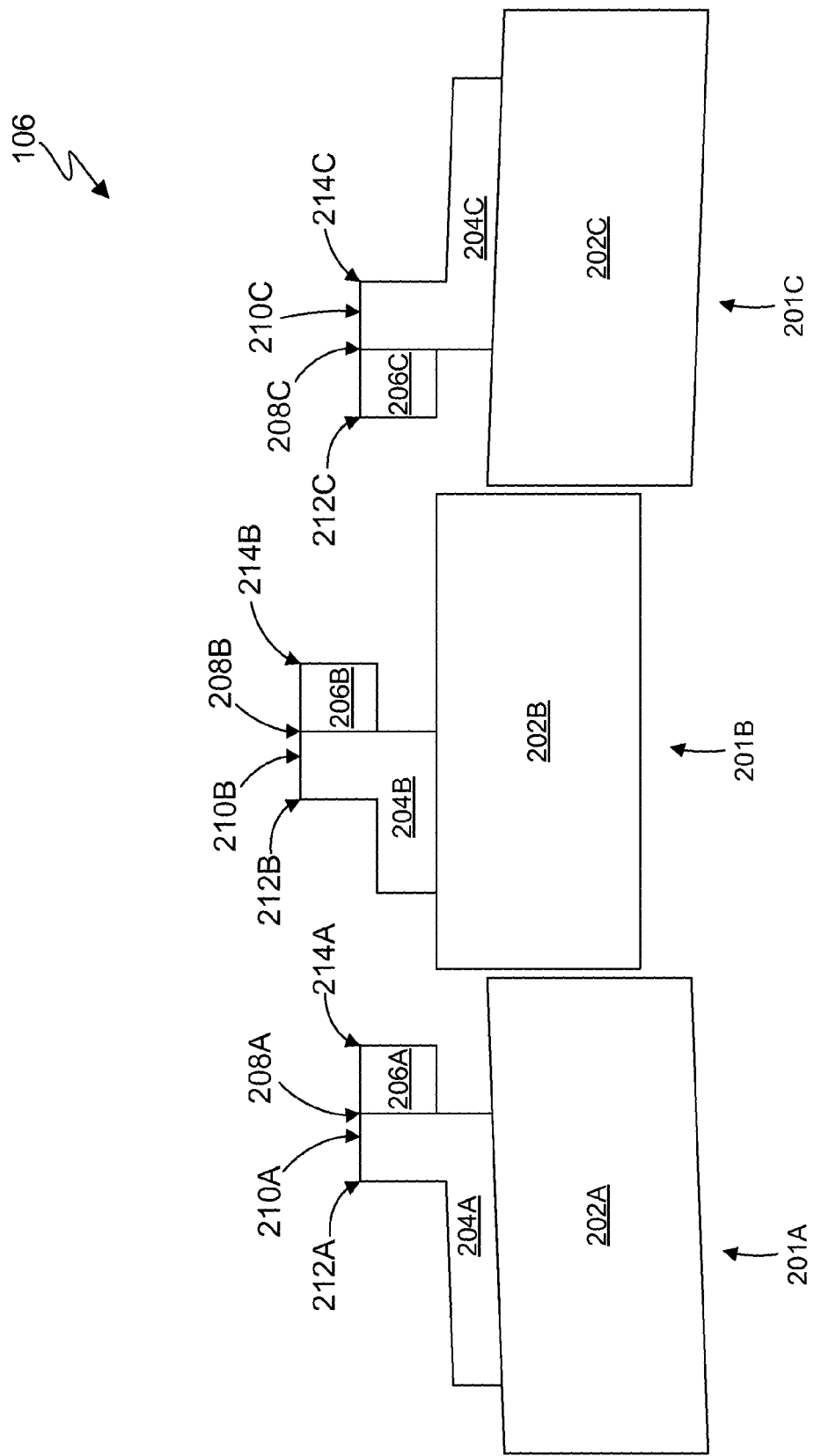
FIG. 2 is a diagram illustrating a tape head, in accordance with an embodiment of the present invention.

FIG. 2 is a diagram illustrating tape head 106, in accordance with an embodiment of the present invention. In this embodiment, tape head 106 is a bi-directional, three-module magnetic tape head have modules 201A, 201B, and 201C in a writer-reader-writer configuration. Tape head 106 also includes one or more servo readers (not shown), as previously discussed. Each module comprises a respective base 202A-C, substrate 204A-C, closure 206A-C, and film 208A-C disposed between substrate 204A-C and closure 206A-C in which reader and writer elements are formed. Each module further includes a respective tape bearing surface 210A-C, which extends from skiving edge 212A-C to skiving edge 214A-C. In operation, as discussed in greater detail with regard to FIGS. 3A-3F and FIG. 4, tape 102 (not shown in FIG. 2) can be moved over one or more of tape bearing surfaces 210A-C such that the reader and writer elements in films 208A-C can read and write data on tape 102. When tape 102 travels over tape head 106 at higher speeds, air adherent to the bottom surface of tape 102 can cause tape 102 to "fly" over tape head 106 and the reader and writer modules therein. Skiving edges 212A-C and 214A-C are used to skive (i.e., scrape) air adherent to the bottom surface of tape 102, which creates a vacuum and improves contact between the respective tape bearing surfaces 210A-C and the bottom surface of tape 102, thereby improving reading and/or writing of data on tape 102. In other embodiments, tape head 106 can be implemented with other module configurations, such as a reader-writer-reader configuration. In yet other embodiments, tape head 106 can be implemented with any suitable tape head technology known in the art.

FIG. 3 is a diagram illustrating tape head 106, in accordance with another embodiment of the present invention. The embodiment of FIG. 3 contains elements previously discussed with respect to FIG. 2, so a separate discussion of such elements will not be repeated herein. In this embodiment, tape head 106 comprises only two modules, module 201A and module 201C, which are inclined relative to each other in a reader/writer-reader/writer configuration. During a write operation in which tape 102 is moving from module 201A toward module 201C, module 201A writes data and module 201C reads and verifies data. During a write operation in which tape 102 is moving from module 201C toward module 201A, module 201C writes data and module 201A reads and verifies data. During read operations, one or both of modules 201A and 201C can read data.

Figure 4:
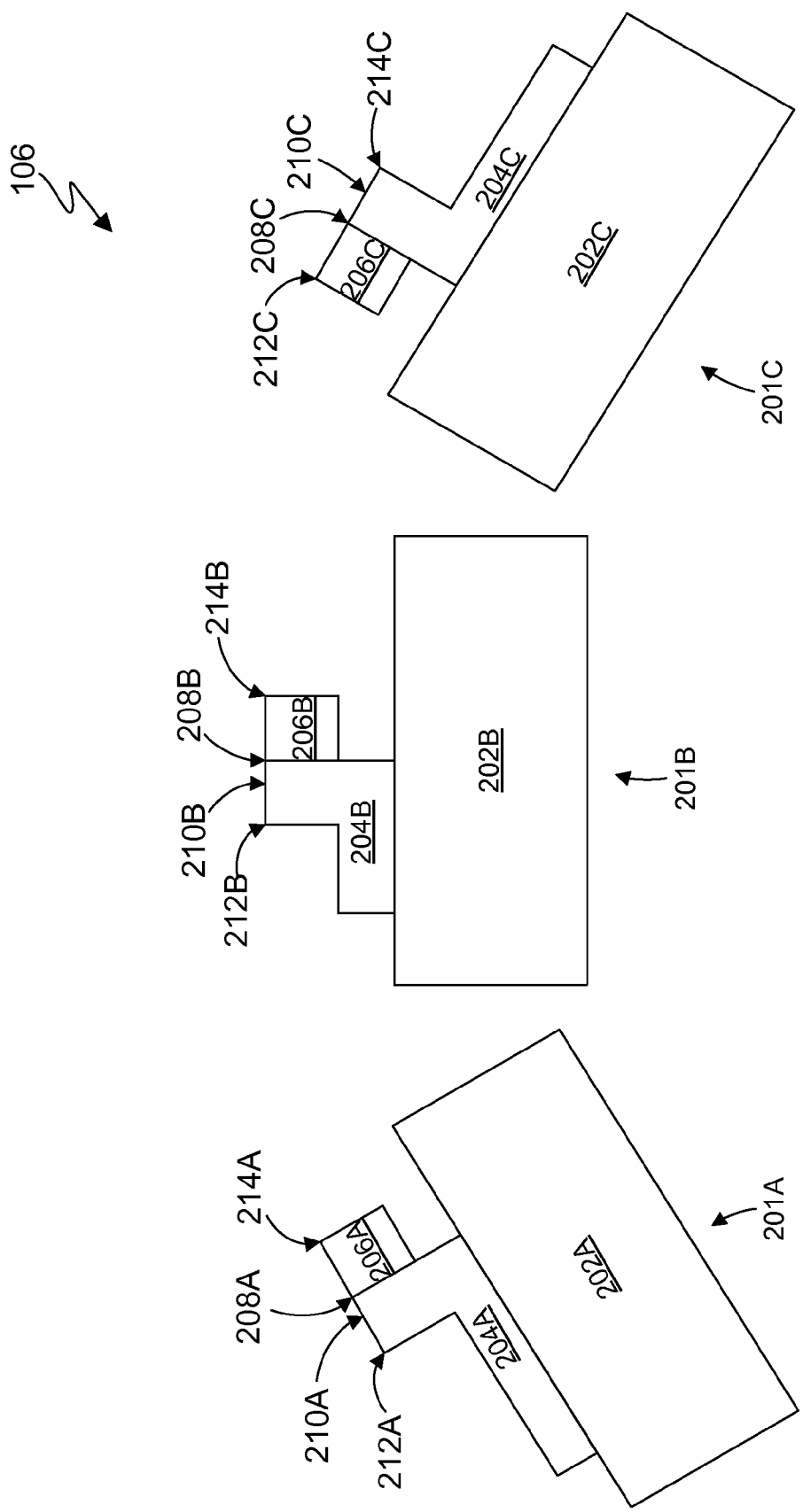
FIG. 4 is a diagram illustrating a tape head, in accordance with another embodiment of the present invention.

FIG. 4 is a diagram illustrating tape head 106, in accordance with another embodiment of the present invention. The embodiment of FIG. 4 contains elements previously discussed with respect to FIG. 2, so a separate discussion of such elements will not be repeated herein. In this embodiment, tape head 106 comprises modules 201A, module 201B, and module 201C, in a writer-reader-writer configuration. In this embodiment, modules 201A and 201C are inclined relative to each other and module 201B to increase effectiveness of skiving edges 214A, 212B, 214B, and 212C in skiving air adherent to the bottom surface of tape 102.

FIGS. 5A-5C and FIG. 8 are diagrams illustrating movement of rollers to achieve various wrap angles and disengage tape 102 from tape head 106 of FIG. 2, in accordance with an embodiment of the present invention. For illustrative purposes, these diagrams depict tape 102 traveling from module 201C toward 201A; however, it should be understood tape 102 can also travel from module 201A toward module 201C, and that the operations discussed herein are also applicable to the reverse direction (i.e., module 201A and module 201C can switch roles).

As shown in FIG. 5A, tape 102 is supported by rollers 110A and 110B and is wrapped over modules 201A-C of tape head 106. In this embodiment, tape head wrap angle $\theta_1$ is defined between a plane in which tape bearing surface 210A resides and the path of tape 102 over roller 110A; tape head wrap angle $\theta_2$ is defined between a plane in which tape bearing surface 210C resides and the path of tape 102 over roller 110B. While paths of tape 102 are depicted as being straight throughout the figures, it should be understood that in practice the paths of tape 102 may be straight and/or curved.

Figure 8:
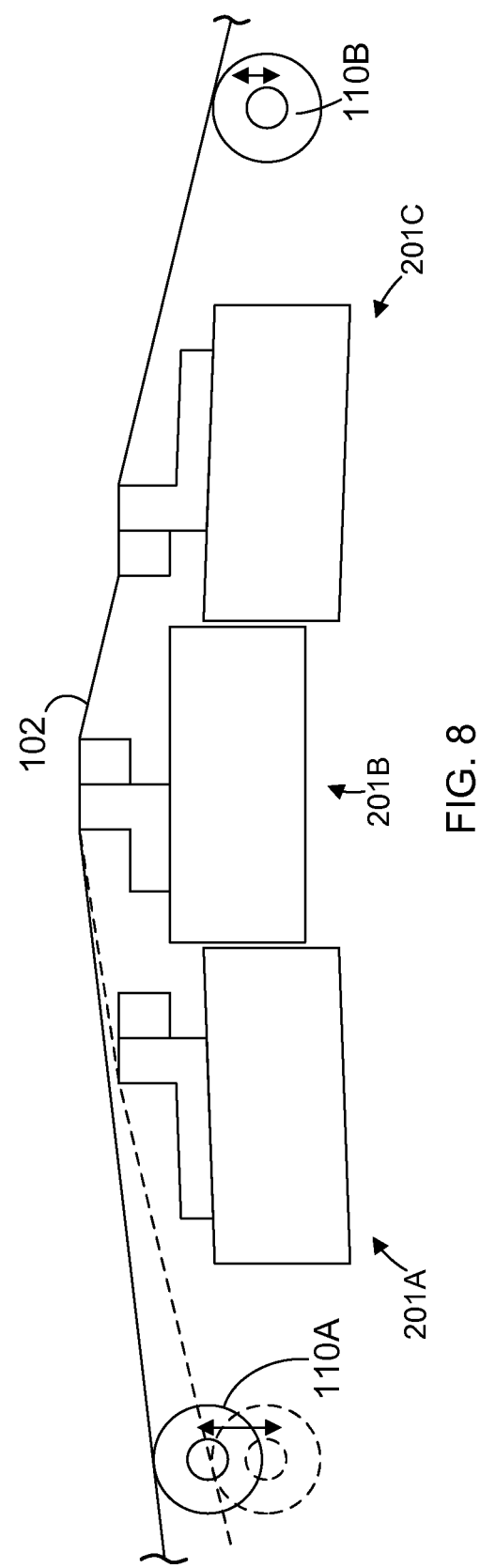
FIG. 8 is a diagram illustrating movement of rollers to achieve various wrap angles and disengage tape from the tape head of FIG. 2, in accordance with another embodiment of the present invention.

As shown in FIG. 5A, controller 114, in conjunction with actuators 112A and 112B, can independently control movement of rollers 110A and 110B to achieve various tape head wrap angles and combinations thereof. In FIGS. 5A-5C, rollers 110A and 110B employ an eccentric movement mechanism, where actuators 112A and 112B rotate rollers 110A and 110B, respectively, upon an eccentric axis such that tape 102 is lifted or lowered relative to tape head 106, thereby increasing or decreasing the respective wrap angles. In FIG. 8, rollers 110A and 110B employ a linear translation movement mechanism, where actuators 112A and 112B raise and lower rollers 110A and 110B, respectively, in a linear fashion. In other embodiments, other movement mechanisms may be used.

FIG. 5A shows a configuration in which rollers 110A and 110B are at their lowest vertical position relative to tape head 106 (i.e., no rotation about their respective eccentric axes). Wrap angle $\theta_2$ and contact pressure between tape 102 and tape bearing surfaces 210B and 210C are greatest in this configuration. Tape 102 may contact skiving edge 212A or, at certain tape speeds, air may be entrained under tape 102 because skiving edge 214A is not in contact with tape 102, causing tape 102 to fly over skiving edge 212A. The eccentric axes of rollers 110A and 110B can be disposed relative to tape head 106 to adjust their lowest possible vertical positions (and the greatest possible wrap angles and contact pressures) relative to tape head 106 based upon desired ranges of wrap angles, ranges of tape contact pressures, and other design considerations. For example, a desired range of available wrap angles $\theta_1$ and $\theta_2$ may be 0.2 degrees to 1.0 degrees, or a larger range such as 0.2 to 4.0 degrees that provides the ability to exert higher contact pressures on tape head 106 (e.g., to dislodge edge debris or scrub off media build-up from tape head 106).

FIG. 5B shows a configuration in which roller 110A is rotated about its eccentric axis to achieve its highest vertical position relative to tape head 106, resulting in disengagement of tape 102 from tape bearing surface 210A of module 201A. Disengaging tape 102 from tape bearing surface 210A eliminates contact pressure between these components and any wear that would otherwise result from such contact. For example, disengaging tape 102 from tape bearing surface 210A may be performed during a writing process in which module 201A is downstream (i.e., tape 102 is moving over tape head 106 from module 201C toward module 201A), or during a read process.

FIG. 5C shows a configuration in which roller 110A and roller 110B are rotated about their eccentric axes to achieve their highest vertical positions relative to tape head 106, resulting in disengagement of tape 102 from tape bearing surface 210A of module 201A and tape bearing surface 210C of module 201C. Disengaging tape 102 from tape bearing surfaces 210A and 210C eliminates contact pressure between these components and any wear that would otherwise result from such contact. For example, disengaging tape 102 from tape bearing surfaces 210A and 210C may be performed during a read process. Again, the eccentric axes of rollers 110A and/or 110B can be disposed relative to tape head 106 to adjust their highest possible vertical positions relative to tape head 106 such that they ranges of motion needed to disengage tape 102 from modules of tape head 106 and can achieve desired ranges of wrap angles and tape contact pressures.

FIGS. 6A-6D are diagrams illustrating movement of rollers to achieve various wrap angles and disengage tape 102 from tape head 106 of FIG. 3, in accordance with an embodiment of the present invention. Again, for illustrative purposes, these diagrams depict tape 102 traveling from module 201C toward 201A; however, it should be understood tape 102 can also travel from module 201A toward module 201C, and that the operations discussed herein are also applicable to the reverse direction (i.e., module 201A and module 201C can switch roles).

Figure 6A:
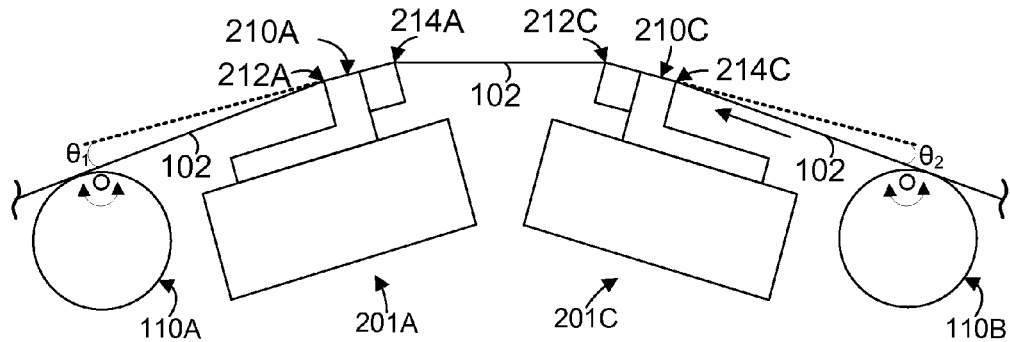
FIGS. 6A-6D are diagrams illustrating movement of rollers to achieve various wrap angles and disengage tape from the tape head of FIG. 3, in accordance with an embodiment of the present invention.

FIG. 6A shows a configuration in which rollers 110A and 110B are at their lowest vertical position relative to tape head 106 (i.e., no rotation about their respective eccentric axes), resulting in wrap angles $\theta_1$ and $\theta_2$ that are approximately equal. In this configuration, wrap angles $\theta_1$ and $\theta_2$ and contact pressure between tape 102 and tape bearing surfaces 210A and 210C are greatest. Furthermore, contact pressure between tape 102 and skiving edges 212A and 214C is greatest.

Figure 6B:
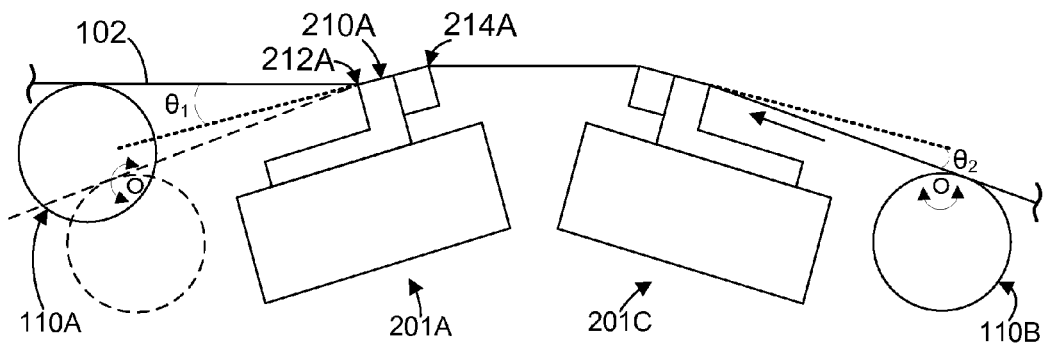

FIG. 6B shows a configuration in which roller 110A has been rotated about its eccentric axis, thereby lifting tape 102 and decreasing wrap angle $\theta_1$, as compared to the configuration of FIG. 6A (shown in dashed lines). Decreasing wrap angle $\theta_1$ decreases contact pressure between tape 102, tape bearing surface 210A, and skiving edges 212A and 214A, which can decrease wear of these components, prolong the lifespan of these components, and decrease stiction between tape 102 and tape bearing surface 210A. Conversely, increasing wrap angle $\theta_1$ increases contact pressure between tape 102, tape bearing surface 210A, and skiving edges 212A and 214A, which can improve signal strength as tape head 106 reads and writes data to tape 102, but may result in increased component wear and stiction. Decreasing or increasing wrap angle $\theta_2$ respectively decreases or increases contact pressure between tape 102, tape bearing surface 210C, and skiving edges 212C and 214C, having the same corresponding effects discussed above. Accordingly, as discussed in greater detail later in this specification, wrap angles $\theta_1$ and $\theta_2$ and may be increased and decreased to achieve optimal contact based on a variety of factors, such as the components used (e.g., tape media type and head type), the age (i.e., usage) of components, operations being performed, and desired performance characteristics.

In this embodiment, as shown in FIG. 6B wrap angle $\theta_1$ has been decreased to a negative value relative to the configuration of FIG. 6A. As a result, tape 102 is no longer wrapped over skiving edge 212A, which significantly decreases contact pressure between these components and can prolong their lifespan to an even greater extent. Contact between tape 102 and tape bearing surface 210A is still maintained by virtue of the vacuum created on the bottom surface of tape 102 by skiving edge 214A. Accordingly, this configuration can be used where module 201A is not being used during a read operation (i.e., where module 201C is being used to read data) and where module 201A is being used during a write operation (i.e., where module 201C is writing data and module 201A is being used to read and verify the data being written).

Figure 6C:
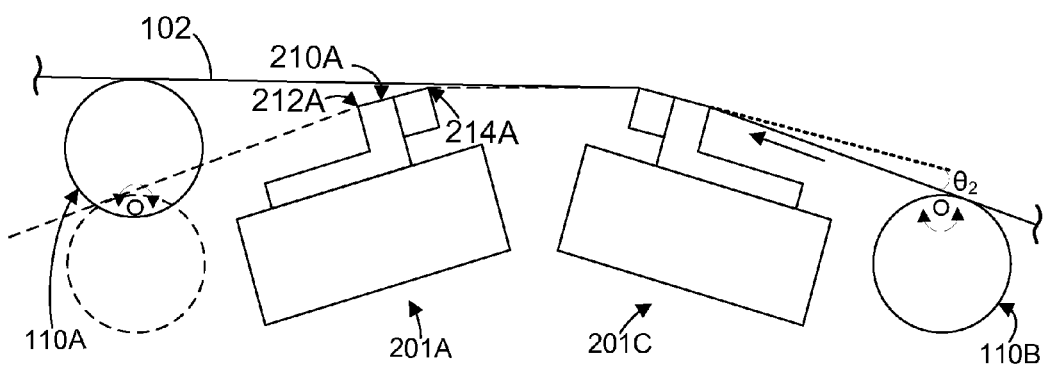

FIG. 6C shows a configuration in which roller 110A is rotated about its eccentric axis to achieve its highest vertical position relative to tape head 106, resulting in disengagement of tape 102 from tape bearing surface 210A of module 201A. Disengaging tape 102 from tape bearing surface 210A may be performed, for example, during a reading process in which module 201C is used to read data on tape 102.

Figure 6D:
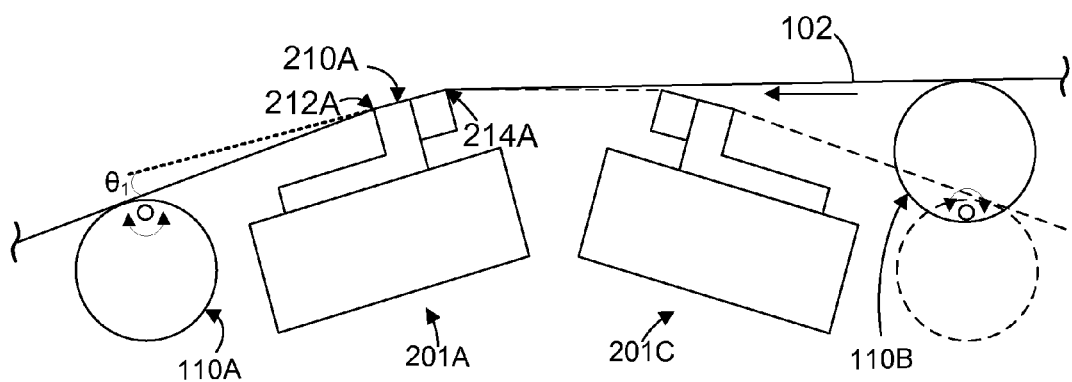

FIG. 6D shows a configuration in which roller 110B is rotated about its eccentric axis to achieve its highest vertical position relative to tape head 106, resulting in disengagement of tape 102 from tape bearing surface 210C of module 201C. Disengaging tape 102 from tape bearing surface 210C may be performed, for example, during a reading process in which module 201A is used to read data on tape 102.

Figure 7C:
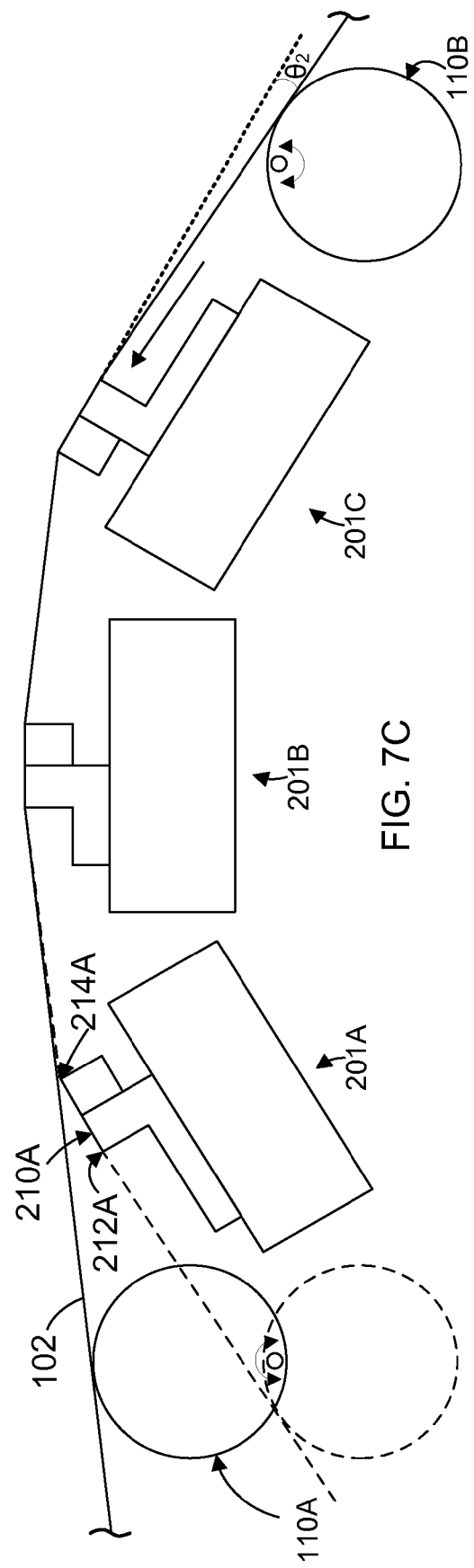

FIGS. 7A-7C are diagrams illustrating movement of rollers to achieve various wrap angles and disengage tape 102 from tape head 106 of FIG. 4, in accordance with an embodiment of the present invention. Again, for illustrative purposes, these diagrams depict tape 102 traveling from module 201C toward 201A; however, it should be understood tape 102 can also travel from module 201A toward module 201C, and that the operations discussed herein are also applicable to the reverse direction (i.e., module 201A and module 201C can switch roles).

FIG. 7A shows a configuration in which rollers 110A and 110B are at their lowest vertical position relative to tape head 106 (i.e., no rotation about their respective eccentric axes), resulting in wrap angles $\theta_1$ and $\theta_2$ that are approximately equal. In this configuration, wrap angles $\theta_1$ and $\theta_2$ and contact pressure between tape 102 and tape bearing surfaces 210A-C are greatest. Furthermore, contact pressure between tape 102 and skiving edges 212A and 214C is greatest.

FIG. 7B shows a configuration in which roller 110A has been rotated about its eccentric axis, thereby lifting tape 102 and decreasing wrap angle $\theta_1$, as compared to the configuration of FIG. 7A (shown in dashed lines). As shown in FIG. 7B wrap angle $\theta_1$ has been decreased to a negative value relative to the configuration of FIG. 7A. As a result, tape 102 is no longer wrapped over skiving edge 212A, which significantly decreases contact pressure between these components and can prolong their lifespan to an even greater extent. Contact between tape 102 and tape bearing surface 210A is still maintained by virtue of the vacuum created on the bottom surface of tape 102 by skiving edge 214A. This configuration can be used, for example, where module 201A is not being used during a read operation (i.e., where module 201B is being used to read data) and where module 201A is not being used during a write operation (i.e., where module 201C is writing data and module 201B is being used to read and verify the data being written).

FIG. 7C shows a configuration in which roller 110A is rotated about its eccentric axis to achieve its highest vertical position relative to tape head 106, resulting in disengagement of tape 102 from tape bearing surface 210A of module 201A. Disengaging tape 102 from tape bearing surface 210A eliminates contact pressure between these components and any wear that would otherwise result from such contact. For example, disengaging tape 102 from tape bearing surface 210A may be performed during a writing process (i.e., where module 201A is downstream and is not writing) or during a read process (i.e., where module 201B is reading data from tape 102). Again, the eccentric axes of rollers 110A and/or 110B can be disposed relative to tape head 106 to adjust their highest possible vertical positions relative to tape head 106 such that they ranges of motion needed to disengage tape 102 from modules of tape head 106 and can achieve desired ranges of wrap angles and tape contact pressures.

FIG. 8 is a diagram illustrating movement of rollers to achieve various wrap angles and disengage tape 102 from the tape head of FIG. 2, in accordance with another embodiment of the present invention. In this embodiment, rollers 110A and 110B can be linearly translated to move tape 102 to decrease tape wrap angles, increase tape wrap angles, and disengage tape 102 from modules 201A and 201C. In the configuration shown in FIG. 8, roller 110A is linearly translated to achieve its highest vertical position relative to tape head 106, resulting in disengagement of tape 102 from tape bearing surface 210A of tape head 106.

Figure 9:
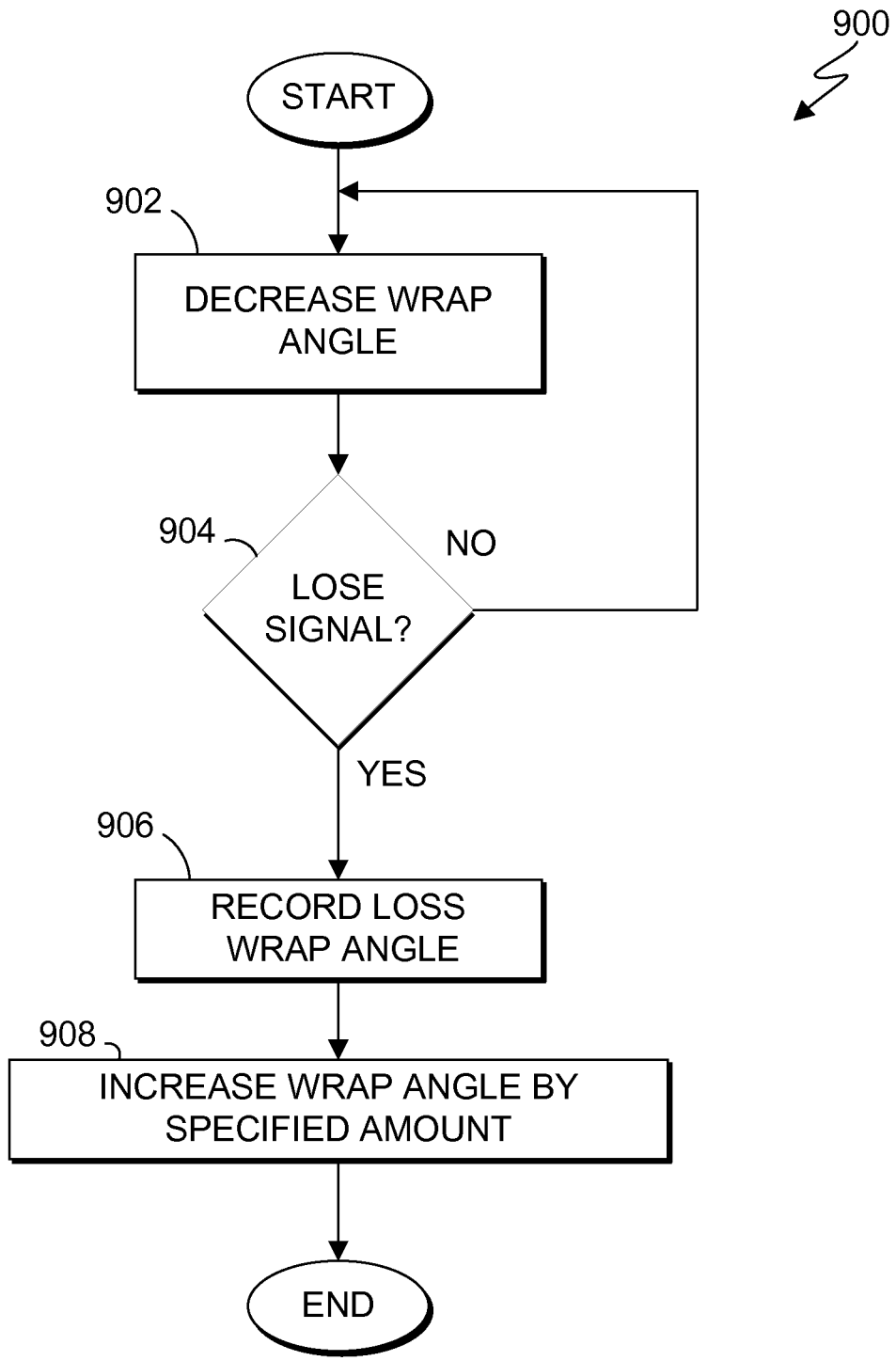
FIG. 9 is a flowchart illustrating operations for setting a wrap angle based on a loss wrap angle, in accordance with an embodiment of the present invention.

FIG. 9 is a flowchart 900 illustrating operations for setting a wrap angle based on a loss wrap angle, in accordance with an embodiment of the present invention. The phrase "loss wrap angle", as used herein, refers to a wrap angle at which tape servo readers within tape head 106 lose servo signals. In this embodiment, wrap angles are set in a manner that minimizes contact pressure between tape 102 and a module of tape head 106, while still maintaining satisfactory signal strength from servo readers within tape head 106. For illustrative purposes, the following discussion is made with respect to actuator 112A, roller 110A, module 201A, and tape head wrap angle $\theta_1$; however, it should be understood that these operations are also applicable to actuator 112B, roller 110B, module 201C, and tape head wrap angle $\theta_2$, and/or other actuators, rollers, modules, and tape head wrap angles that might be present in tape drive 100.

Controller 114 transmits instructions to actuator 112A to move roller 110A to decrease tape head wrap angle $\theta_1$ by a specified amount (operation 902), which decreases contact pressure between tape 102 and components of module 201A. For example, tape head wrap angle $\theta_1$ may be decreased in increments of 0.05 degrees.

While tape 102 is passing over tape head 106, controller 114 determines whether servo readers within tape head 106 have lost servo signals (operation 904), which would indicate that the servo readers are no longer able to read the servo tracks on tape 102. If controller 114 determines that servo readers within tape head 106 have not lost servo signals, controller 114 again transmits instructions to actuator 112A to decrease tape head wrap angle $\theta_1$ by the specified amount (operation 902), which further decreases contact pressure between tape 102 and components of module 201A.

If controller 114 determines that servo readers within tape head 106 have lost servo signals, controller 114 records the tape head wrap angle $\theta_1$ as a loss wrap angle (operation 906).

Controller 114 transmits instructions to actuator 112A to move roller 110A to increase tape head wrap angle $\theta_1$ by a specified amount (operation 908), where the specified amount is sufficient to increase contact pressure between tape 102 and components of module 201A and allow the servo readers to read the servo tracks on tape 102 (e.g., 0.05 degrees or greater).

In certain embodiments, the specified amount can be selected to achieve contact pressures that provide optimal signal resolutions for data read from tape 102. For example, controller 114 can detect spacing between modules of tape head 106 and tape 102 based on signal resolution, calculated as a ratio of amplitudes of high frequency tape wavelength signals (e.g., 2T signals) to low frequency tape wavelength signals (e.g., 8T signals). Tape head wrap angle $\theta_1$ may be adjusted (e.g., swept) over a range of angles (e.g., greater than or equal to 0.3 degrees and less than or equal to 2.0 degrees) to find an angle that yields an optimal signal resolution that is closest to 1. An optimal signal resolution threshold may also be defined, such as, for example, any ratio greater than or equal to 0.3.

Accordingly, by performing operations of FIG. 9, controller 114 can determine and set an optimal wrap angle at which contact pressure between tape 102 and module 201A is minimized, but servo readers within tape head 106 remain able to read servo tracks on tape 102. Loss wrap angles and tape head wrap angles based thereon can be determined upon first use of tape 102 (e.g., inserting a new tape cartridge) and/or periodically during usage. Furthermore, these angles can be configured according to user specifications without requiring manual adjustment of the wrap angles (e.g., using hand tools to move rollers 110A and 110B) during initial configuration and/or servicing of tape drive 100. In this manner, tape head wrap angles $\theta 1$ and $\theta_2$ can be customized for varying characteristics of tape 102 and tape head 106.

Figure 10:
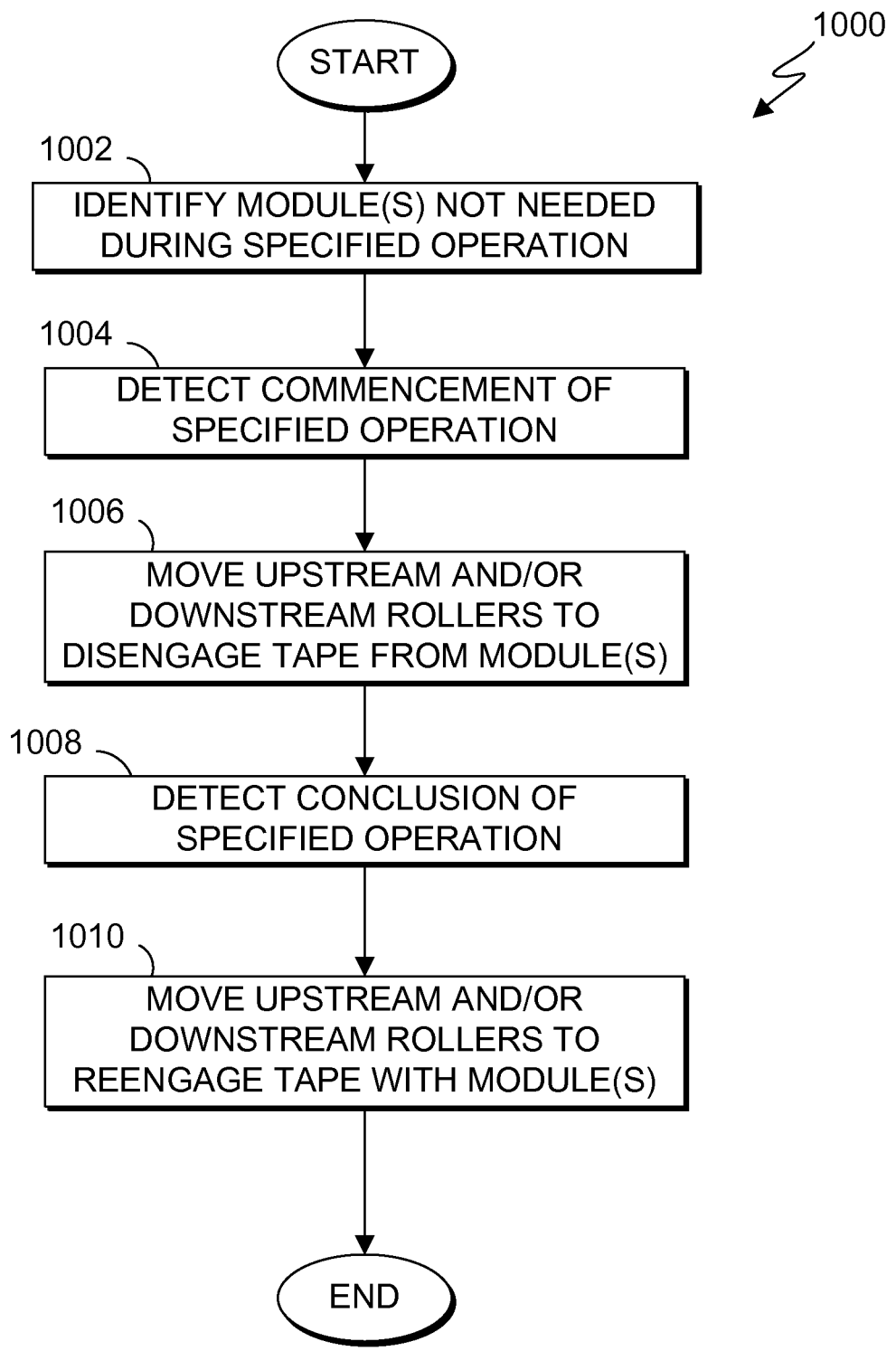
FIG. 10 is a flowchart illustrating operations for disengaging and reengaging tape from modules of a tape head, in accordance with another embodiment of the present invention.

FIG. 10 is a flowchart 1000 illustrating operations for disengaging and reengaging tape from modules of a tape head, in accordance with an embodiment of the present invention. Controller 114 identifies one or more modules of tape head 106 that are not needed during a specified tape drive operation (operation 1002). In this embodiment, controller 114 can identify one or more modules of tape head 106 that are not needed during read operations, write operations, tape leader engagement operations (i.e., when loading tape 102 into tape drive 100), rewind operations, cleaning operations, seek operations, and idle states (e.g., in which data is not being read from or written to tape 102) based on specified parameters for a particular configuration of tape head 106.

In this embodiment, for tape leader engagement operations, rewind operations, or idle states, controller 114 identifies modules 201A and 201C as being not needed, for two-module and three-module configurations. For read operations using a three-module writer-reader-writer configuration, controller 114 identifies modules 201A and 201C as being not needed. For write operations using a three-module writer-reader-writer configuration, controller 114 identifies whichever writer module is downstream. For example, where tape 102 is moving over tape head 106 from module 201C toward module 201A during a write operation, module 201A is regarded as being downstream and not needed during the write operation. Where tape 102 is moving over tape head 106 from module 201A toward module 201C, module 201C is regarded as being downstream and not needed during the write operation. For read operations using a two-module reader/writer-reader/writer configuration, controller 114 identifies whichever module is not performing the read operation (e.g., module 201A or module 201C) as not being needed during the read operation.

Controller 114 detects commencement of a specified operation (operation 1004). In this embodiment, controller 114 detects commencement of one of the specified conditions discussed above.

Controller 114 moves upstream and/or downstream rollers to disengage tape 102 from the one or more modules of tape head 106 that are identified as being not needed for the specified operation that has been detected (operation 1006). In this embodiment, controller 114 moves upstream and/or downstream rollers by transmitting instructions to the appropriate actuators 112A and/or 112B to move rollers 110A and/or 110B such that tape 102 is disengaged from modules 201A and/or 201C, respectively.

Controller 114 detects the conclusion of the detected specified operation (operation 1008), and moves the upstream and/or downstream rollers to reengage tape 102 with the one or more modules of tape head 106 (operation 1008) that are identified as being not needed for the specified operation that has concluded. Again, controller 114 moves upstream and/or downstream rollers by transmitting instructions to the appropriate actuators 112A and/or 112B to move rollers 110A and/or 110B such that tape 102 is disengaged from modules 201A and/or 201C, respectively. In this embodiment, controller 114 transmits instructions to reengage tape 102 at the most recently set wrap angle $\theta_1$ or $\theta_2$. As previously discussed, controller 114 can also transmit instructions to reengage tape 102 and to find tape head wrap angles angle $\theta_1$ or $\theta_2$ that yield optimal signal resolutions for data read from tape 102.

Accordingly, by performing operations of FIG. 10, controller 114 can disengage tape 102 from one or more modules of tape head 106 during times at which those modules are not reading or writing data to tape 102. In this manner, wear of tape 102 and tape head 106 can be reduced and the lifespan of these components can be extended.

Figure 11:
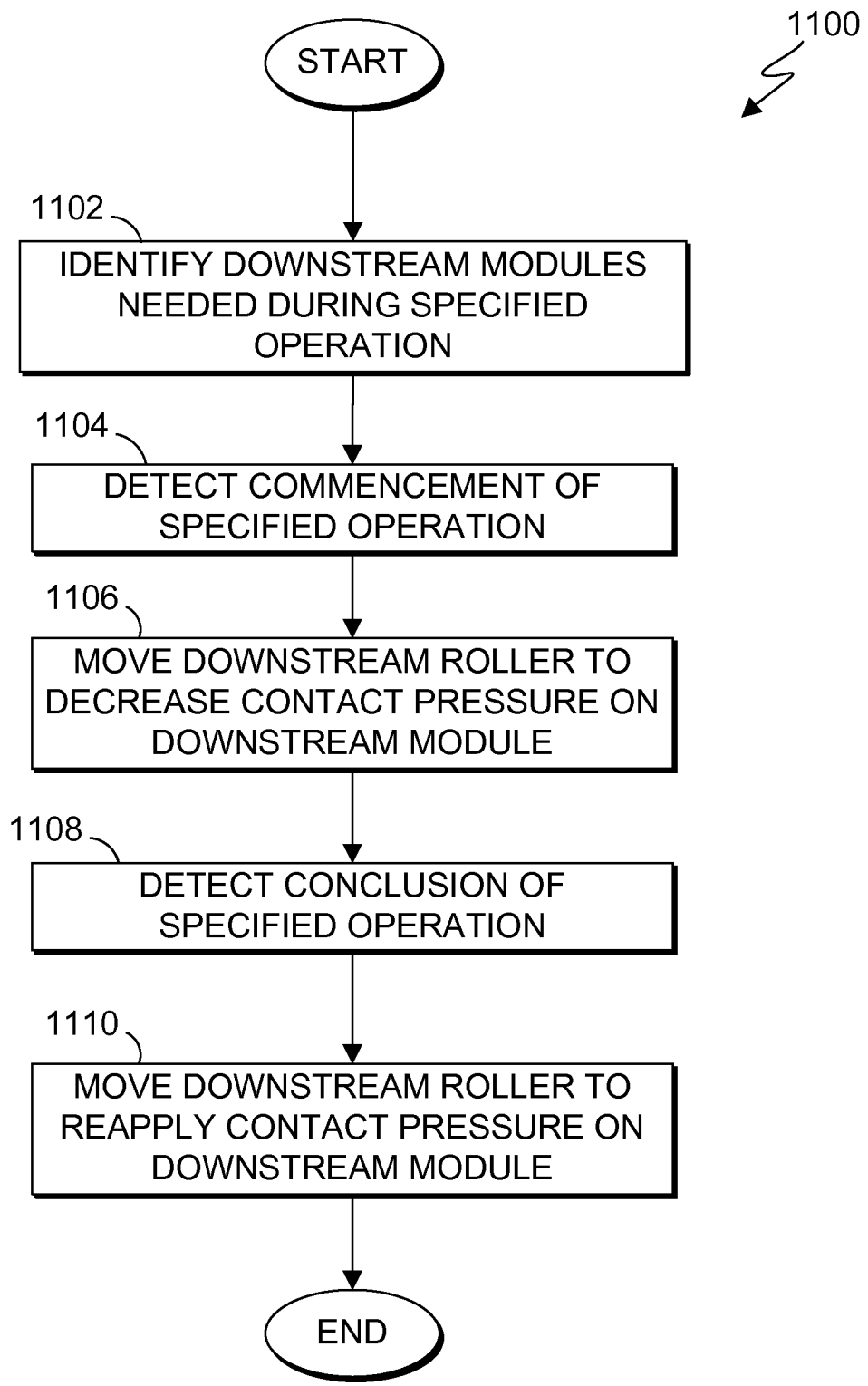
FIG. 11 is a flowchart illustrating operations for modifying wrap angles, in accordance with an embodiment of the present invention.

FIG. 11 is a flowchart illustrating operations for modifying wrap angles, in accordance with an embodiment of the present invention. Controller 114 identifies a downstream module of tape head 106 that is needed during a specified tape drive operation (operation 1102). In this embodiment, controller 114 identifies the downstream module of tape head 106 as being needed for write operations in a two-module reader/writer-reader/writer configuration.

Controller 114 detects commencement of the specified operation (operation 1004), and controller 114 moves the downstream roller to decrease contact pressure between tape 102 and the downstream module of tape head 106 (operation 1106). In this embodiment, controller 114 moves the downstream roller by transmitting instructions to the appropriate actuators 112A or 112B to move rollers 110A or 110B to decrease tape head wrap angle $\theta_1$ or $\theta_2$, respectively.

Controller 114 detects the conclusion of the specified operation (operation 1108), and moves the downstream roller to increase contact pressure between tape 102 and the downstream module of tape head 106 (operation 1110). In this embodiment, controller 114 transmits instructions to the appropriate actuators 112A or 112B to move roller 110A or 110B to increase tape head wrap angle $\theta_1$ or $\theta_2$ to the most recently set tape head wrap angle $\theta_1$ or $\theta_2$, respectively. Again, controller 114 can also transmit instructions to find tape head wrap angles angle $\theta_1$ or $\theta_2$ that yield optimal signal resolutions for data read from tape 102.

Accordingly, by performing operations of FIG. 11, controller 114 can decrease the tape head wrap angle over a downstream module of tape head 106 during times at which that module is needed for reading or writing data to tape 102 and, therefore, would not be suitable for disengaging, in accordance with the operations of FIG. 11. Again, in this manner, wear of tape 102 and tape head 106 can be reduced and the lifespan of these components can be extended.

Figure 12:
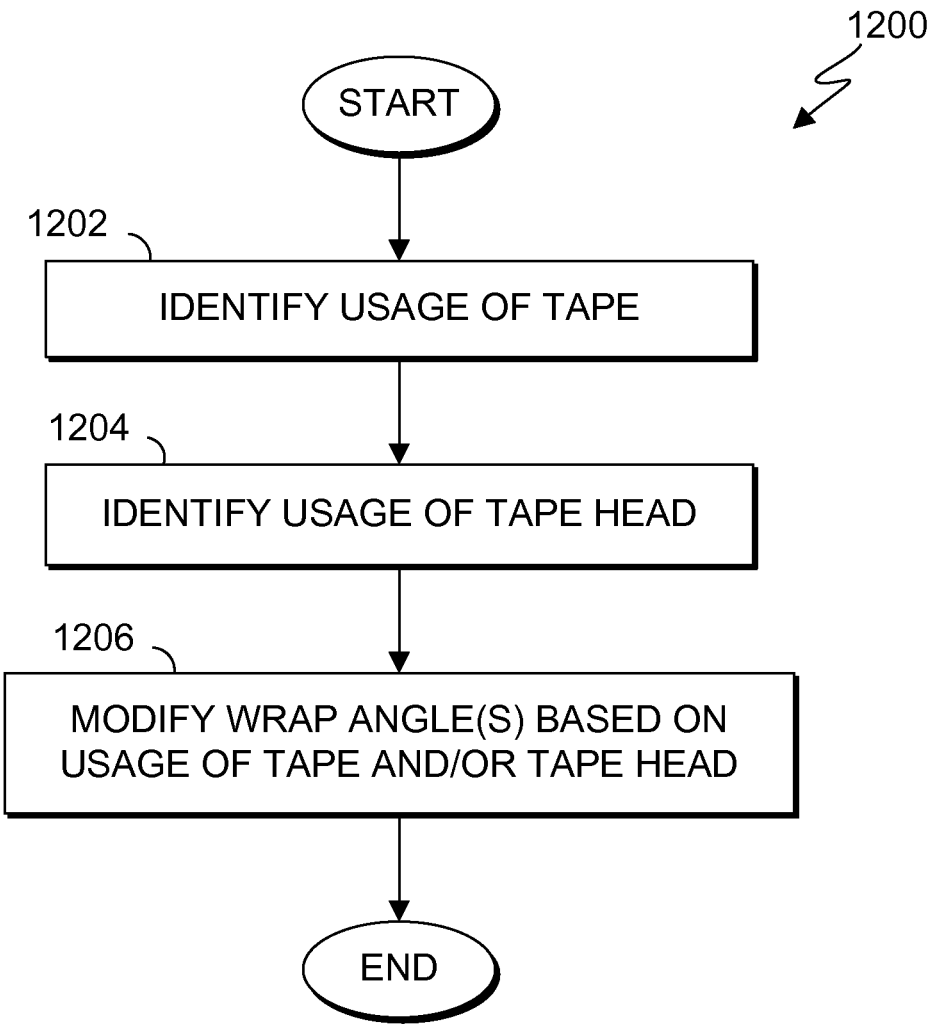
FIG. 12 is a flowchart illustrating operations for modifying wrap angles, in accordance with another embodiment of the present invention.

FIG. 12 is a flowchart 1200 illustrating operations for modifying wrap angles based on usage of tape 102 and tape head 106, in accordance with an embodiment of the present invention. During operation of tape drive 100, controller 114 identifies the extent to which tape 102 has been used (operation 1202). In this embodiment, controller 114 can receive tape media information (e.g., type and usage history) for tape 102 via interface 118, such as from a host to which tape drive 100 is connected. Controller 114 can also identify tape information by analyzing description information associated with tape 102 itself, such as by reading an RFID chip in a cartridge containing tape 102. Controller 114 can also maintain a record of usage of tape 102 by storing usage information in memory 116 upon first loading tape 102 into tape drive 100 and updating the stored usage information each time tape 102 is used. The extent to which tape 102 has been used can be expressed, for example, as cumulative minutes or hours of operation and/or cumulative numbers of read and write operations. In another embodiment, the extent to which tape 102 has been used can be expressed in terms of "wraps", where movement of tape 102 over tape head 106 in one direction across its entire length constitutes one wrap.

Controller 114 identifies the extent to which tape head 106 has been used (operation 1204). In this embodiment, controller 114 maintains a record of the usage of tape head 106 by storing usage information in memory 116. In another embodiment, controller 114 can receive usage information for tape head 106 via interface 118, such as from a host to which tape drive 100 is connected. The extent to which tape head 106 has been used can be expressed, for example, as cumulative minutes or hours of operation and/or cumulative numbers of read and write operations performed by tape head 106 or individual modules thereof. In another embodiment, the extent to which tape head 106 has been used can be expressed in terms of the number of wraps experienced by tape head 106.

Controller 114 modifies one or both of wrap angles $\theta_1$ and $\theta_2$ based on identified usages of tape 102 and/or tape head 106 (operation 1206). In this embodiment, where the identified usages of tape 102 or tape head 106 exceed a specified value (e.g., a threshold value above which the components are regarded as being used enough to require increased tape contact pressures to maintain low error rates), controller 114 transmits instructions to actuators 112A and 112B to move rollers 110A and 110B and increase tape head wrap angles $\theta_1$ and $\theta_2$ by a specified amount from the most recently set wrap angles (e.g., by +1.0 degrees), which increases contact pressure between tape 102 and components of modules 201A and 201C. In another embodiment, where identified usages of tape 102 or tape head 106 fall below a specified value (e.g., a threshold value below which the components are regarded as being new enough to use increased tape contact pressures to burnish or break in new tape media), controller 114 transmits instructions to actuators 112A and 112B to move rollers 110A and 110B and increase tape head wrap angles $\theta_1$ and $\theta_2$ by a specified amount from the most recently set wrap angles to achieve a specified tape head wrap angles $\theta_1$ and $\theta_2$, such as angles greater than or equal to 1.5 degrees and less than or equal to 2.5 degrees.

Accordingly, by performing operations of FIG. 12, wrap angles $\theta_1$ and $\theta_2$, and the resulting contact pressures between tape 102 and tape head 106, can be dynamically adjusted based on the usage of tape 102 and/or tape head 106, without requiring manual adjustment of the wrap angles (e.g., using hand tools to move rollers 110A and 110B) during initial configuration and/or servicing of tape drive 100. In this manner, wrap angles can be customized for characteristics of tape 102 and tape head 106 that change throughout their lifespans. For example, newer, less used tape media may be more abrasive, warranting lesser wrap angles (i.e., decreased contact pressure between tape head 106 and tape 102), but as the tape media is used, it may become smoother, warranting greater wrap angles (i.e., increased contact pressure between tape head 106 and tape 102). Similarly, as tape head 106 is used, skiving edges 212A-C and 214A-C may become dull, requiring increased wrap angles (i.e., increased contact pressure between tape head 106 and tape 102) to maintain the same skiving effects. In other instances, greater wrap angles might be desired for newer tape media to expedite a break-in process. In various embodiments of the present invention, controller 114 can dynamically adjust wrap angles $\theta_1$ and $\theta_2$ based on other factors, such as a change of media type, generation, and/or brand of tape 102. For example, different types, generations, and/or brands of tape media may have different abrasiveness and performance characteristics, so controller 114 may access stored, customized wrap angle settings (e.g., preset during manufacture) upon detecting that tape 102 is of a particular media type, generation, and/or brand. In other embodiments, controller 114 can also dynamically adjust wrap angles $\theta_1$ and $\theta_2$ based on signal resolutions for data read from tape 102, as previously discussed.

Figure 13:
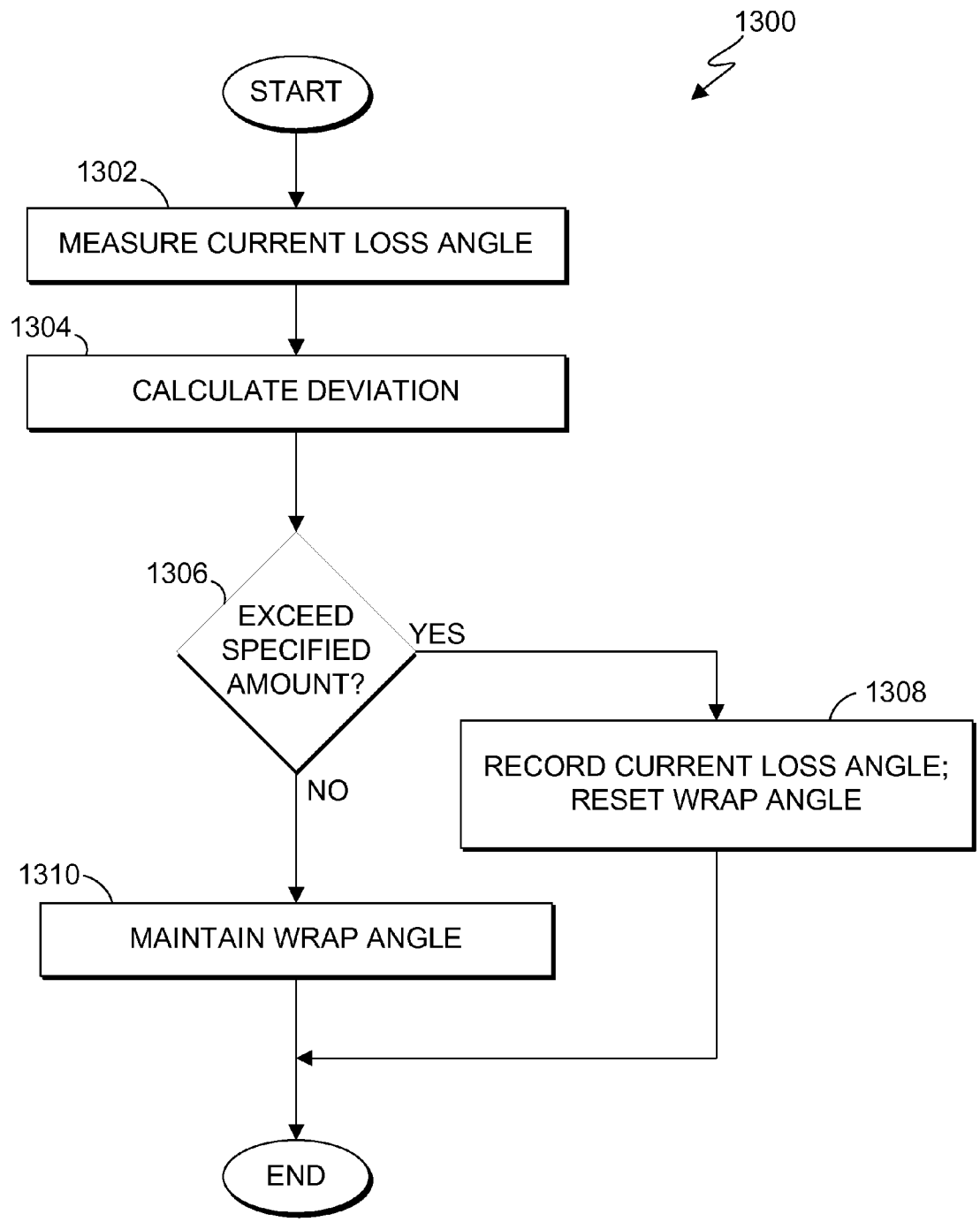
FIG. 13 is a flowchart illustrating operations for modifying wrap angles, in accordance with another embodiment of the present invention.

FIG. 13 is a flowchart 1300 illustrating operations for resetting a wrap angle, in accordance with an embodiment of the present invention. Again, for illustrative purposes, the following discussion is made with respect to actuator 112A, roller 110A, module 201A, and tape head wrap angle $\theta_1$; however, it should be understood that these operations are also applicable to actuator 112B, roller 110B, module 201C, and tape head wrap angle $\theta_2$, and/or other actuators, rollers, modules, and tape head wrap angles that might be present in tape drive 100.

During operation of tape drive 100, controller 114 measures a current loss wrap angle (operation 1302). In this embodiment, controller 114 periodically measures a current loss angle by decreasing tape head wrap angle $\theta_1$ until servos within tape head 106 lose signal, as previously discussed with regard to operations 902 and 904 of FIG. 9.

Controller 114 compares the current loss wrap angle to the most recently recorded loss wrap angle for tape head wrap angle $\theta_1$ (e.g., recorded at time of manufacture or upon a prior recalibration) and calculates the deviation thereof (operation 1304). Deviation can be calculated in terms of angular deviation (e.g., +/−0.05 degrees) or percent difference (e.g., +/−15%) from the most recently recorded loss wrap angle.

Controller 114 determines whether the calculated deviation exceeds a specified amount (operation 1306). Again, the specified amount may be expressed in terms of a maximum acceptable angular deviation (e.g., +/−0.30 degrees) or maximum acceptable percent difference (e.g., +/−40%) from the most recently recorded loss wrap angle. For example, during initial configuration of tape drive 100 (e.g., at time of manufacture), various addition settings of tape drive 100, such as write currents, reader bias, and error compensation settings, may be optimized based on the recorded loss wrap angles. If the current loss wrap angle is not significantly different from the recorded loss wrap angle, it may not be desirable to reset wrap angles $\theta_1$ based on the current loss wrap angle and have to recalibrate these other settings of tape drive 100. Accordingly, a user can specify a maximum amount of deviation, above which it is desirable to reset wrap angles $\theta_1$ based on the current loss wrap angle, even though doing so might require recalibration of other settings of tape drive 100 based on the current loss wrap angle.

If controller 114 determines that the calculated deviation exceeds the specified amount, controller 114 records the current loss wrap angle and resets wrap angle $\theta_1$ based on the current loss wrap angle (operation 1308). In this embodiment, controller 114 records the current loss wrap angle and replaces the previously recorded loss wrap angle. Controller 114 resets wrap angle $\theta_1$ by transmitting instructions to actuator 112A to move roller 110A to increase wrap angle $\theta_1$ by a specified amount from the current (and now recorded) loss wrap angle, as previously discussed with regard to operation 908 of FIG. 9.

If controller 114 determines that the calculated deviation does not exceed the specified amount, controller 114 maintains the current wrap angle $\theta_1$ (operation 1310).

Accordingly, by performing operations of FIG. 13, controller 114 can dynamically adjust wrap angles $\theta_1$ and $\theta_2$ during operation of tape drive 100 to maintain optimal wrap angles $\theta_1$ and $\theta_2$ that reflect current operational conditions and characteristics of tape 102, tape head 106, and other components of tape drive 100.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for operating a tape drive, comprising:
   identifying, by one or more computer processors, a first extent to which a magnetic tape has been used;
   identifying, by one or more computer processors, one or more modules of a tape head for which a tape head wrap angle should be modified;
   responsive to determining, by one or more computer processors, that the first extent to which the magnetic tape has been used is less than a first specified threshold, moving one or more tape supports of the tape drive to a first configuration to increase contact pressure between one or more modules of the tape head and the magnetic tape and burnish at least a portion of the magnetic tape;
   subsequent to the moving one or more tape supports of the tape drive to the first configuration, identifying, by one or more computer processors, a second extent to which the magnetic tape has been used, wherein the second extent represents a greater amount of usage of the magnetic tape than the first extent; and
   responsive to determining, by one or more computer processors, that the second extent to which the magnetic tape has been used exceeds a second specified threshold, moving one or more tape supports of the first tape drive to a second configuration to decrease contact pressure between one or more modules of the tape head and the magnetic tape.

2. The method of claim 1, wherein identifying, by one or more computer processors, a first extent to which a magnetic tape has been used comprises:
   analyzing, by one or more computer processors, description information associated with the magnetic tape to identify a first extent to which a magnetic tape has been used, wherein the first extent is expressed as a number of read and write operations performed on the magnetic tape.

3. The method of claim 2, wherein analyzing, by one or more computer processors, description information associated with the magnetic tape comprises:
   reading an RFID chip in a cartridge containing the magnetic tape.

4. The method of claim 1 further comprising:
   detecting, by one or more computer processors, a brand of the magnetic tape;
   accessing, by one or computer processors, a customized wrap angle setting for the brand of the magnetic tape; and
   moving one or more tape supports of the tape drive to modify a tape head wrap angle of the magnetic tape over the identified one or more modules of the tape head based on the customized wrap angle setting for the brand of the magnetic tape.

5. The method of claim 1, further comprising:
   storing usage information associated with the magnetic tape upon loading the magnetic tape into the tape drive.

6. The method of claim 1, further comprising:
   receiving usage information associated with the magnetic tape from a computer to which the tape drive is connected.

7. The method of claim 1, further comprising identifying, by one or more computer processors, an extent to which the tape head has been used, wherein the extent to which the tape head has been used is expressed as a number of read and write operations performed by the tape head.

8. The method of claim 7, further comprising:
   moving one or more tape supports of the tape drive to modify a tape head wrap angle of the magnetic tape over the identified one or more modules of the tape head based, at least in part, on the identified extent to which the tape head has been used.

9. A tape drive, comprising:
   a tape head;
   a plurality of tape supports; and
   a controller configured to perform operations comprising:
      identifying one or more characteristics of a magnetic tape;
      identifying one or more modules of the tape head for which a tape head wrap angle should be modified;
      responsive to determining that the first extent to which the magnetic tape has been used is less than a first specified threshold, moving one or more tape supports of the tape drive to a first configuration to increase contact pressure between one or more modules of the tape head and the magnetic tape and burnish at least a portion of the magnetic tape;
      subsequent to the moving one or more tape supports of the tape drive to the first configuration, identifying a second extent to which the magnetic tape has been used, wherein the second extent represents a greater amount of usage of the magnetic tape than the first extent; and
      responsive to determining that the second extent to which the magnetic tape has been used exceeds a second specified threshold, moving one or more tape supports of the first tape drive to a second configuration to decrease contact pressure between one or more modules of the tape head and the magnetic tape.

10. The tape drive of claim 9, wherein identifying a first extent to which a magnetic tape has been used comprises analyzing description information associated with the magnetic tape to identify a first extent to which a magnetic tape has been used, wherein the first extent is expressed as a number of read and write operations performed on the magnetic tape.

11. The tape drive of claim 10, wherein analyzing description information associated with the magnetic tape comprises reading an RFID chip in a cartridge containing the magnetic tape.

12. The tape drive of claim 9, wherein the options further comprise:
   detecting a brand of the magnetic tape;
   accessing a customized wrap angle setting for the brand of the magnetic tape; and
   moving one or more tape supports of the tape drive to modify a tape head wrap angle of the magnetic tape over the identified one or more modules of the tape head based on the customized wrap angle setting for the brand of the magnetic tape.

13. The tape drive of claim 9, wherein the operations further comprise storing usage information associated with the magnetic tape upon loading the magnetic tape into the tape drive.

14. The tape drive of claim 9, wherein the operations further comprise receiving usage information associated with the magnetic tape from a computer to which the tape drive is connected.

15. The tape drive of claim 9, wherein the operations further comprise identifying an extent to which the tape head has been used, wherein the extent to which the tape head has been used is expressed as a number of read and write operations performed by the tape head.

16. The tape drive of claim 15, wherein the operations further comprise:

moving one or more tape supports of the tape drive to modify a tape head wrap angle of the magnetic tape over the identified one or more modules of the tape head based, at least in part, on the identified extent to which the tape head has been used.

17. The method of claim 1, further comprising:

detecting, by one or more computer processors, a generation of the magnetic tape;

accessing, by one or computer processors, a customized wrap angle setting for the generation of the magnetic tape; and moving one or more tape supports of the tape drive to modify a tape head wrap angle of the magnetic tape over the identified one or more modules of the tape head based on the customized wrap angle setting for the generation of the magnetic tape.

18. The tape drive of claim 9, wherein the operations further comprise:

detecting a generation of the magnetic tape;

accessing a customized wrap angle setting for the generation of the magnetic tape; and moving one or more tape supports of the tape drive to modify a tape head wrap angle of the magnetic tape over the identified one or more modules of the tape head based on the customized wrap angle setting for the generation of the magnetic tape.

\* \* \* \* \*